United States Patent
Tani et al.

(10) Patent No.: US 11,277,058 B2
(45) Date of Patent: Mar. 15, 2022

(54) REPAIR METHOD FOR BAR OR COIL OF ROTATING ELECTRICAL MACHINE

(71) Applicant: MITSUBISHI POWER, LTD., Yokohama (JP)

(72) Inventors: Yoichi Tani, Yokohama (JP); Takashi Usui, Yokohama (JP); Seijiro Muramatsu, Yokohama (JP); Mitsuru Onoda, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 51 days.

(21) Appl. No.: 16/709,308

(22) Filed: Dec. 10, 2019

(65) Prior Publication Data

US 2020/0212769 A1 Jul. 2, 2020

(30) Foreign Application Priority Data

Dec. 27, 2018 (JP) .............................. JP2018-244983

(51) Int. Cl.
*H02K 15/00* (2006.01)
*H02K 15/10* (2006.01)

(52) U.S. Cl.
CPC ....... *H02K 15/0006* (2013.01); *H02K 15/105* (2013.01)

(58) Field of Classification Search
CPC .......................... H02K 15/0006; H02K 15/105
See application file for complete search history.

(56) References Cited

U.S. PATENT DOCUMENTS

| | | | | | |
|---|---|---|---|---|---|
| 6,140,733 A | * | 10/2000 | Wedde | ................... | H02K 3/345 310/196 |
| 2002/0046867 A1 | * | 4/2002 | Leijon | ...................... | H02K 3/48 174/110 R |

(Continued)

FOREIGN PATENT DOCUMENTS

| CN | 107659072 A | * | 2/2018 | ............. H01L 21/02 |
|---|---|---|---|---|
| JP | 55-012828 B1 | | 4/1980 | |
| JP | 58-097815 A | | 6/1983 | |

(Continued)

OTHER PUBLICATIONS

Japanese Office Action dated Oct. 19, 2021 for Japanese Patent Application No. 2018-244983.

*Primary Examiner* — Peter Dungba Vo
*Assistant Examiner* — Jose K Abraham
(74) *Attorney, Agent, or Firm* — Volpe Koenig (57) ABSTRACT

A bar or coil includes a conductor arranged in a rotating electrical machine and an insulating layer having a predetermined insulation thickness disposed on a surface of the conductor. The repair method includes: extracting a part of the bar or coil as a repair target; removing the insulating layer in a part of the bar or coil as the repair target; disposing a first insulating layer in the part where the insulating layer is removed, the first insulating layer having an insulation thickness thinner than the predetermined insulation thickness; and disposing a second insulating layer on a surface of the first insulating layer to form an insulating layer after a repair where the first insulating layer and the second insulating layer are added, the insulating layer after the repair having a thickness of the predetermined insulation thickness.

8 Claims, 5 Drawing Sheets

(56) References Cited

U.S. PATENT DOCUMENTS

| | | | | |
|---|---|---|---|---|
| 2008/0284555 | A1* | 11/2008 | Levit | H02K 15/0006 336/200 |
| 2011/0179643 | A1* | 7/2011 | Baumann | H02K 15/12 29/887 |

FOREIGN PATENT DOCUMENTS

| | | | | | |
|---|---|---|---|---|---|
| JP | 2003-319617 | A | | 11/2003 | |
| JP | 2010-074908 | A | | 4/2010 | |
| JP | 2010074908 | A | * | 4/2010 | H02K 15/0056 |
| JP | 2011-120397 | A | | 6/2011 | |
| KR | 20170110889 | B1 | * | 11/2017 | H01L 21/02 |

* cited by examiner

REPAIR METHOD FOR BAR OR COIL OF ROTATING ELECTRICAL MACHINE

CLAIM OF PRIORITY

The present application claims priority from Japanese Patent application serial No. 2018-244983, filed on Dec. 27, 2018, the content of which is hereby incorporated by reference into this application.

TECHNICAL FIELD

The present invention relates to a repair method for bar or coil of a rotating electrical machine.

BACKGROUND OF THE INVENTION

The bar or coil included in the rotating electrical machine includes a conductor and an insulating layer disposed on a surface of the conductor. This insulating layer is possibly deteriorated and has a degraded insulation performance due to operating the rotating electrical machine for a long period, and is possibly damaged due to a ground fault during the operating. Thus, techniques of repairing the deteriorated or damaged insulating layer have been developed.

Conventional methods for repairing an insulating layer are disclosed in the following Japanese Unexamined Patent Application Publication Nos. 2011-120397 and 2003-319617. Japanese Unexamined Patent Application Publication No. 2011-120397 discloses an insulation property recovery method for a coil of a DC motor where a peripheral area of a conductor is covered with an insulation tape, and the insulation tape is impregnated in varnish to form an insulating layer. The insulation property recovery method includes: spraying an alcohol diluted with water to have an alcohol concentration of 75 to 90 mass % onto a surface of the insulating layer; determining that an internal insulation deterioration occurs in the insulating layer when a predetermined condition is satisfied; and performing a varnish reimpregnation process including a vacuum defoaming process, a pressurizing-and-impregnation process, and a heating-and-drying process. The vacuum defoaming process dips a motor coil in varnish in an impregnation tank, vacuumizes the impregnation tank, and deairs voids generated in the insulating layer. The pressurizing-and-impregnation process pressurizes the impregnation tank, and reimpregnates the insulating layer in the varnish after performing the vacuum defoaming process. The heating-and-drying process depressurizes the impregnation tank, and heats and dries the motor coil after performing the pressurizing-and-impregnation process.

Japanese Unexamined Patent Application Publication No. 2003-319617 discloses a rotor regeneration method for a rotating electrical machine. In a rotor of the rotating electrical machine, a plurality of slots axially continuous at predetermined intervals in a circumferential direction are formed on an outer peripheral portion of a rotor iron core. In the respective slots, rotor bars are housed, and the rotor bars have end portions electrically connected with a short-circuit ring. A varnish is filled between the rotors bars and the slots to fasten both. On the rotor that has been used for a long period, a curing process is performed to remove the previously impregnated varnish. After that, the rotor is reimpregnated in a new varnish to fill between the rotor bars and the slots.

In the above-described Japanese Unexamined Patent Application Publication Nos. 2011-120397 and 2003-319617, since a process of impregnating the whole bar or coil in varnish is performed, a tank filled with varnish is required. Therefore, a large facility is required. In Japanese Unexamined Patent Application Publication No. 2011-120397, the coil is impregnated in varnish in a vacuum, and thus a facility that can vacuumize the tank is required. Dimensional accuracy of the insulating layer affects an insulation property, and the ensured accuracy is required to house the bar or coil in original position. In order to ensure the dimensional accuracy, it is required to sufficiently examine conditions of the impregnation process, and increase of manufacturing time and cost are concerned.

In consideration of the above-described situations, the present invention provides a repair method for bar or coil of a rotating electrical machine that ensures performing the method using a simple facility and ensures the dimensional accuracy and reliability of the insulation performance.

SUMMARY OF THE INVENTION

One aspect of the present invention to solve the above-described problems is a repair method for bar or coil of a rotating electrical machine. The bar or coil includes a conductor arranged in the rotating electrical machine and an insulating layer having a predetermined insulation thickness disposed on a surface of the conductor. The repair method includes: a step of extracting the bar or coil as repair target; an insulating layer removing step of removing the insulating layer in a part of the bar or coil as the repair target; a first insulating layer formation step of disposing a first insulating layer in the part where the insulating layer is removed at the insulating layer removing step, the first insulating layer having an insulation thickness thinner than the predetermined insulation thickness; and a second insulating layer formation step of disposing a second insulating layer on a surface of the first insulating layer to form an insulating layer after a repair where the first insulating layer and the second insulating layer are added, the insulating layer after the repair having a thickness of the predetermined insulation thickness.

More specific configurations of the present invention are described in claims.

The present invention provides a repair method for bar or coil of a rotating electrical machine that ensures performing the method using a simple facility and ensures the dimensional accuracy and the reliability of the insulation performance.

Problems, configurations, and effects other than ones described above will be made apparent from the following description of embodiments.

DETAILED DESCRIPTION

A method for forming insulating layer of bar or coil typically includes the following three kinds of methods. That is, the three kinds of methods include: (1) a single vacuum pressure impregnation insulation: a method that performs taping on a conductor using insulation tape without resin at bar or coil insulation operation, thereafter performs a step of single vacuum pressure impregnation, and then performs curing and molding so as to form an insulating layer; (2) a resin apply insulation: a method that forms an insulating layer while performing taping on a conductor using insulation tape without resin at bar or coil insulation operation and applying a resin on the insulation tape; and (3) a resin-rich insulation: a method that performs taping using semi-cured resin insulation tape at bar or coil insulation operation, and then performs curing and molding so as to form an insulating layer.

The above-described (1) method requires a facility that performs a single vacuum pressure impregnation. In the above-described method (2), it is difficult to improve dimensional accuracy and reliability of an insulation performance. Therefore, in the following embodiment, the above-described method (3) is employed. The embodiment achieves obtaining the insulating layer that ensures the dimensional accuracy and the reliability of the insulation performance using a simple facility. The following describes the present invention in detail with reference to the drawings.

Figure 1:
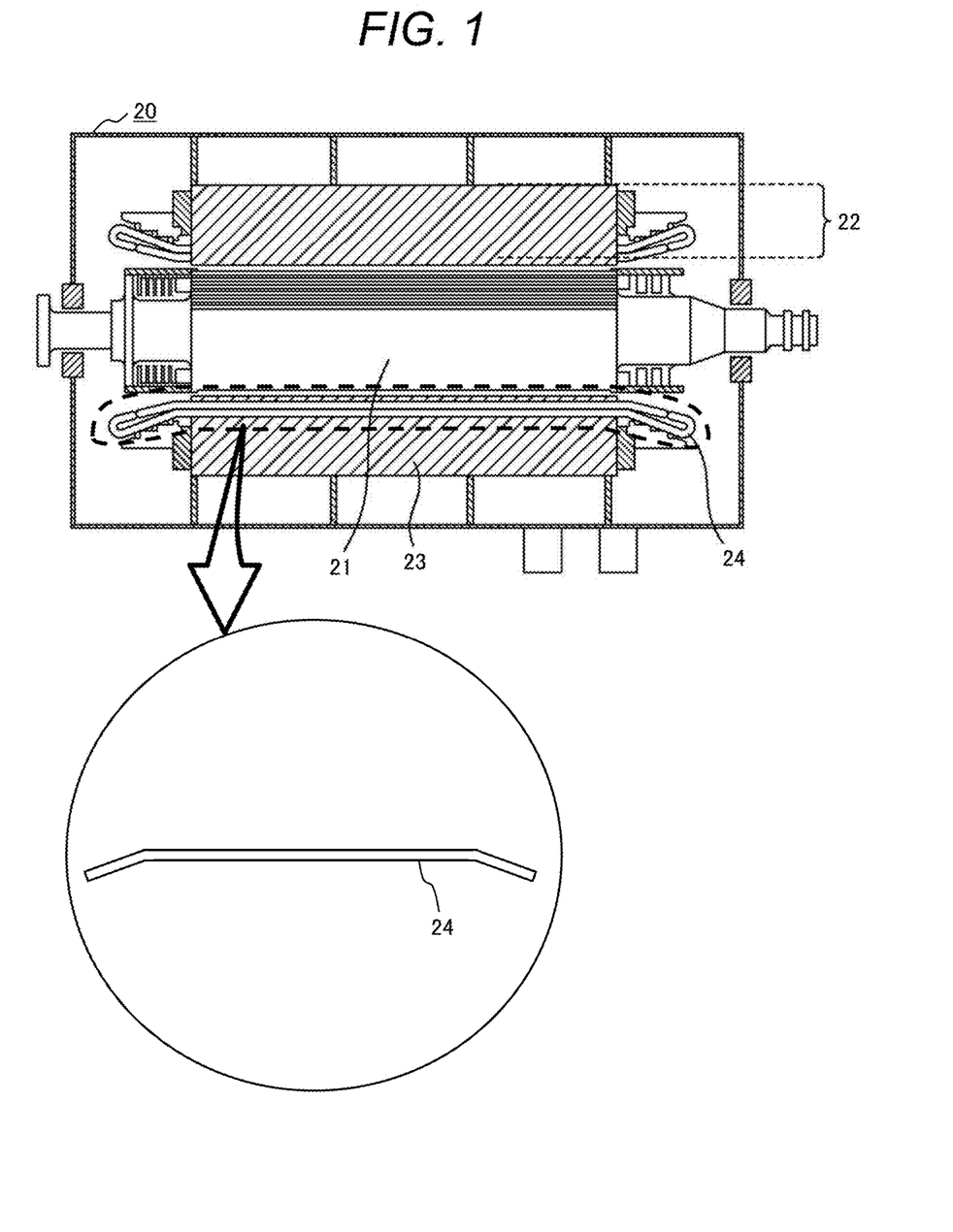
FIG. 1 is a schematic diagram illustrating an exemplary rotating electrical machine to which the present invention is applied.

FIG. 1 is a schematic diagram illustrating an exemplary rotating electrical machine to which the present invention is applied. As illustrated in FIG. 1, a rotating electrical machine 20 includes a rotor 21 and a stator 22. The stator 22 includes a stator iron core 23, stator slots (not illustrated) disposed in the stator iron core 23, and a stator bar or coil 24 housed in the stator slot. This embodiment describes a method where this stator bar or coil 24 is extracted as a repair target bar or coil, and a part of it (repair target portion) is repaired. The repair target is not limited to a stator bar or coil, and any bar or coil that include insulating layer, such as rotor bar or coil, can be the repair target.

Figure 2A:
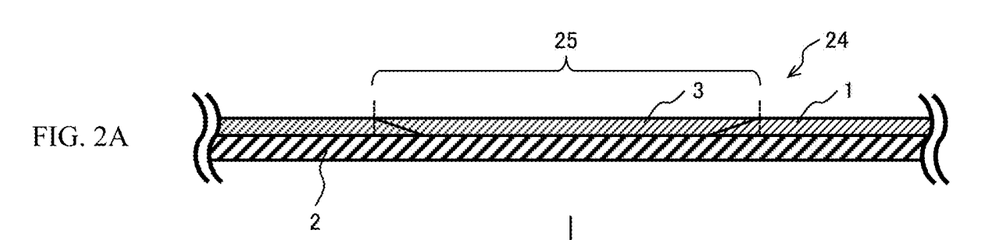
FIGS. 2A to 2D are flow diagrams illustrating an exemplary repair method for bar or coil of the rotating electrical machine of the present invention.
Figure 2B:
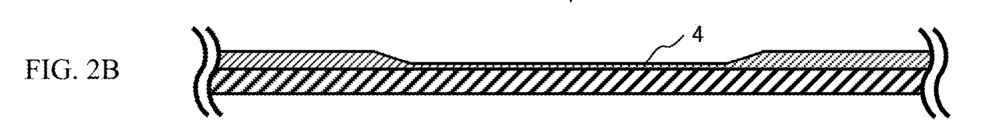

FIGS. 2A to 2D are flow diagrams illustrating an exemplary repair method for bar or coil of the rotating electrical machine of the present invention. As illustrated in FIGS. 2A to 2D, the stator bar or coil 24 includes a conductor 2 and an insulating layer 1 disposed on a surface of the conductor 2. First, a repair target region (portion having damage or a deterioration) 25 on the insulating layer 1 is specified (FIG. 2A), and an insulating layer (insulating layer as a removal target) 3 in the repair target region 25 is removed (insulating layer removing step: FIG. 2B). At this time, the whole insulating layer 1 is not removed in a thickness direction of the bar or coil, and it is preferred to leave an insulation having a half or less of the insulating layer 1 and in at least an innermost layer. This is because an insulation of the conductor 2 is possibly damaged when the whole insulating layer 1 in the repair target region 25 is removed. In particular, a removal method of the insulating layer 1 is not limited, and, for example, the insulating layer 1 can be physically striped by cutting with an edged tool or chemically removed using a solvent that can melt the insulating layer 1.

Figure 2C:
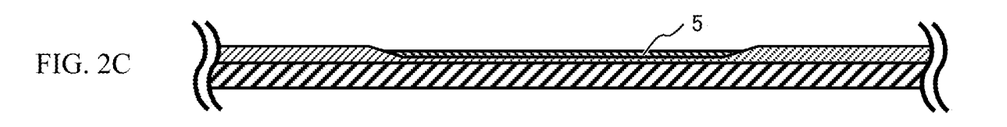

Next, as illustrated in FIG. 2C, on a surface of an insulating layer 4 where a part of the insulating layer is removed, an insulating layer 5 (first insulating layer) having an insulation thickness thinner than an original insulation thickness of the insulating layer 1 is disposed (first insulating layer formation step (temporary fastening step)). The first insulating layer 5 can be manufactured by taping, for example, insulation tape (such as a mica taps) along a circumferential direction of the conductor 2 by the number of taping times fewer than the number of taping times at a time when the insulating layer 1 is formed. The mold method will be described later.

Figure 2D:
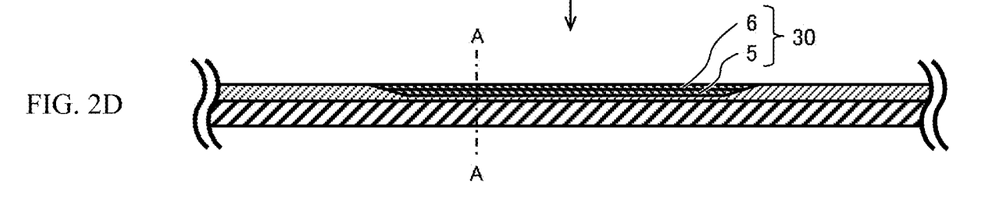

Then, a second insulating layer 6 is disposed on a surface of the first insulating layer 5, and an insulating layer 30 in the repair target region 25, after the insulating layer 4 where the part of the insulating layer 1 is removed, and the first insulating layer 5 and the second insulating layer 6 are disposed, is molded to have an insulation thickness identical to the insulation thickness of the insulating layer 1 (FIG. 2D). Similarly to the first insulating layer 5, the second insulating layer 6 can be manufactured by performing taping on the surface of the first insulating layer 5 by the number of taping times at which the second insulating layer 6 is caused to have the insulation thickness equal to or more than the insulation thickness of the insulating layer 30. After the repair, it is not necessary that the insulating layer 30 has the insulation thickness completely identical to the insulation thickness of the insulating layer 1, and the insulation thickness of the insulating layer 30 may have a slight difference within a range acceptable for the manufacture.

Finally, not illustrated in FIGS. 2A to 2D, the stator bar or coil 24 where the repair is completed is assembled into the stator 22 again, and the repair operation is completed.

Figure 3:
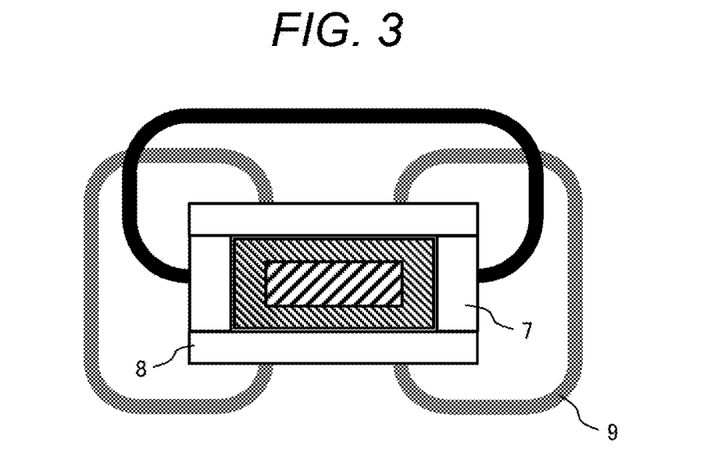
FIG. 3 is a cross-sectional view illustrating an exemplary configuration at a time of molding an insulating layer.
Figure 4:
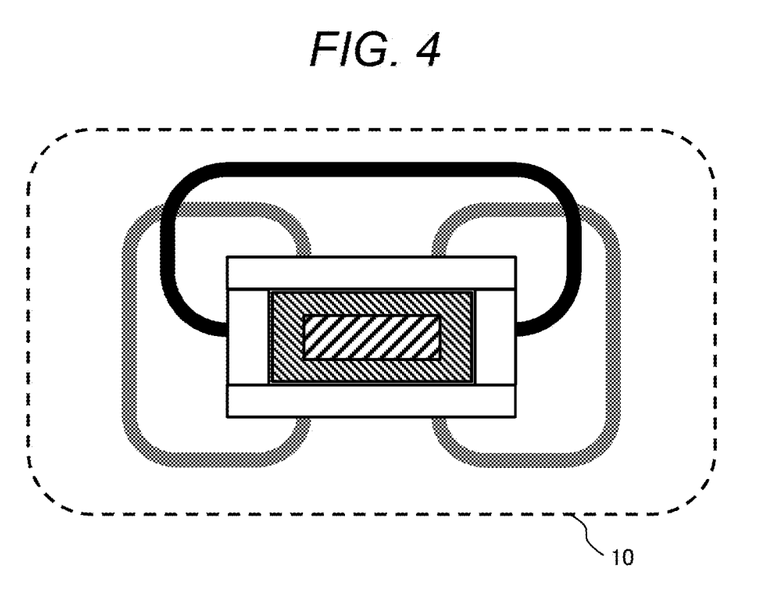
FIG. 4 is a cross-sectional view illustrating another exemplary configuration at a time of molding the insulating layer.

FIG. 3 is a transverse sectional view illustrating an exemplary configuration at a time of molding an insulating layer, and FIG. 4 is a transverse sectional view illustrating another exemplary configuration at a time of molding the insulating layer. FIGS. 3 and 4 illustrate cross-sectional views taken along the line A-A at a time of molding in FIG. 2D. As illustrated in FIG. 3, the second insulating layer 6 can be molded by disposing cored coils 7 that press the second insulating layer 6 in a width direction and iron plates 8 that press the second insulating layer 6 in a thickness direction so as to be pressurized by pressing the cored coils 7 and the iron plates 8 using clamps 9. Such a method ensures the dimensional accuracy and the reliability of the insulation performance.

As illustrated in FIG. 4, when the second insulating layer 6 is formed, the repair target region 25 is covered with a heat insulating material 10 and is heated by supplying hot wind to perform a curing and molding. This ensures the further improved dimensional accuracy and reliability of the insulation performance (molding with a simplified constant temperature furnace). The curing temperature at this time is set to a curing temperature of the resin included in the insulating layer. Covering a peripheral portion of the repair target region 25 or a stator bar or coil end portion with the heat insulating material 10 avoids a heat radiation from a part other than the repair target region 25 as a curing target and curing more than necessary to ensure the enhanced efficiency of temperature rising and temperature keeping in the repair target region 25.

When molding (temporary fastening) the first insulating layer 5, molding the repair target region 25 at a temperature equal to or more than room temperature and lower than the above-described curing temperature ensures the further accurate dimensional accuracy and the further reliable insulation performance. The temperature at this time is set to a temperature lower than the curing temperature of the resin included in the insulating layer. That is, it is preferred to perform it at a temperature equal to or more than the room temperature and lower than the temperature of the molding step of the second insulating layer 6.

Figure 5:
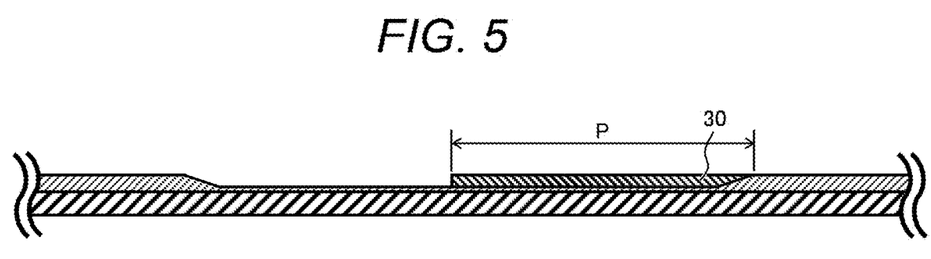
FIG. 5 is a cross-sectional view in a longitudinal direction illustrating an aspect where a part as a repair target is divided into at least two regions to perform a first insulating layer formation step and a second insulating layer formation step.

FIG. 5 is a cross-sectional view in a longitudinal direction illustrating an aspect where a part as the repair target is divided into at least two regions to perform the first insulating layer formation step and a second insulating layer formation step. As illustrated in FIG. 5, it is preferred that the part where the insulating layer is removed at the insulating layer removing step is divided into at least two regions in the longitudinal direction of the bar or coil, and after the first insulating layer formation step and the second insulating layer formation step are performed in one (region P in FIG. 5) of these regions, the first insulating layer formation step and the second insulating layer formation step are performed in another region other than the P region in the part where the insulating layer is removed. Thus, it is preferred that the part where the insulating layer is removed is divided twice or more (the insulating layer is repaired in divided certain ranges and for each range) to perform the repair. While molding the repair target region having a wide range once possibly leads to a part that is not molded enough, the molding as described above ensures the dimensional accuracy and the reliability of the insulation performance even in the insulating layer by the resin-rich-insulation method. At this time, it is preferred that a length of the region P in the longitudinal direction of the bar or coil is 2000 mm or less. When the P exceeds 2000 mm, it is difficult to ensure the dimensional accuracy and the reliability of the insulation performance of the insulating layer.

Figure 6:
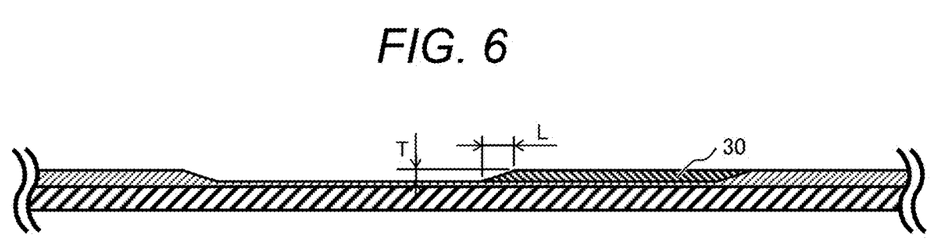
FIG. 6 is a cross-sectional view in the longitudinal direction illustrating an aspect where the insulating layer after a repair has an end portion having a tapered shape.

FIG. 6 is a cross-sectional view in the longitudinal direction illustrating an aspect where the insulating layer after the repair has an end portion having a tapered shape. As illustrated in FIG. 6, it is preferred that the insulating layer after the repair has an end portion having a tapered shape when a cross-sectional surface in the longitudinal direction of the bar or coil is viewed. The end portion of the insulating layer having such a shape ensures the reliability of the insulation performance in the part connecting between the insulating layers. When it is assumed that the tapered shape has an inclined part having a length in the longitudinal direction of the bar or coil as L, and the insulating layer after the repair has an insulation thickness as T, it is preferred that $L \geq T \times 3$ is satisfied. This ensures the reliability of the insulation performance of the insulating layer. As illustrated in FIG. 2, when the insulating layer 1 is removed, it is preferred that end portions of the insulating layer 1 as both ends of the removed part have tapered shapes.

Such a shape of the end portion of the insulating layer can be formed by, for example, cutting the end portion of the insulating layer with an edged tool after the tape is wound.

Figure 7:
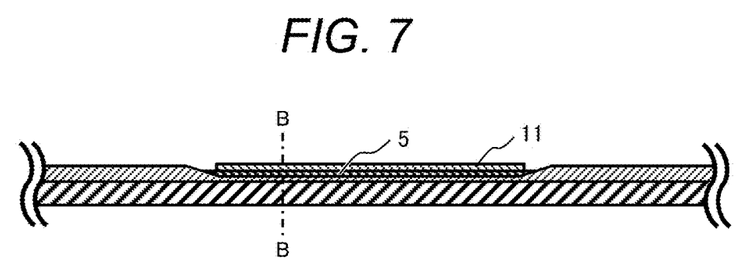
FIG. 7 is a cross-sectional view in the longitudinal direction illustrating an aspect where a first insulating layer has a surface on which a spacer is disposed.
Figure 8:
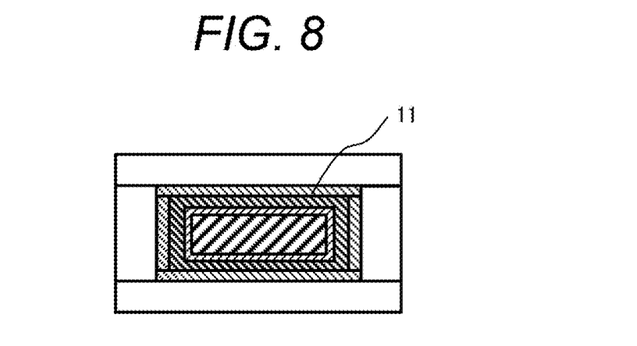
FIG. 8 is a cross-sectional view taken along the B-B line in FIG. 7.

FIG. 7 is a cross-sectional view in the longitudinal direction illustrating an aspect where the first insulating layer has a surface on which a spacer is disposed, and FIG. 8 is a cross-sectional view taken along the B-B line in FIG. 7. As illustrated in FIGS. 7 and 8, it is preferred that when the first insulating layer 5 is molded, a first spacer 11 is disposed on the surface of the first insulating layer 5 to be molded. This ensures the working efficiency and dimensional accuracy when molding the first insulating layer 5, and the reliability of the insulation performance.

Figure 9:
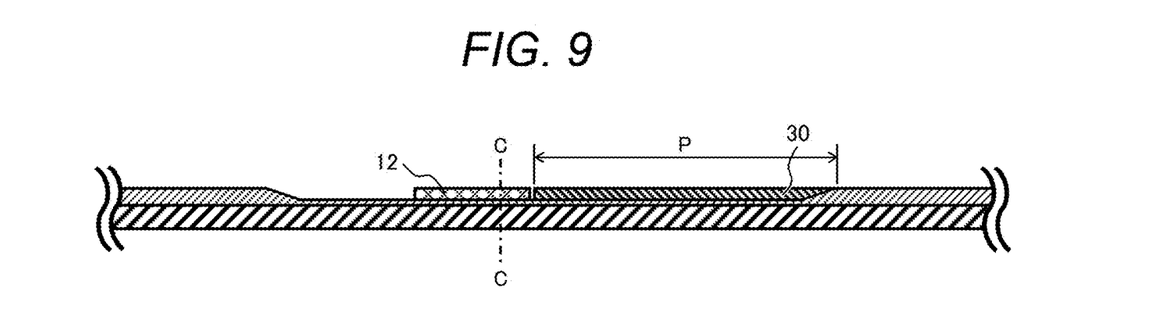
FIG. 9 is a cross-sectional view in the longitudinal direction illustrating an aspect where a spacer is disposed in a region where the first insulating layer formation step or the second insulating layer formation step have not been performed.
Figure 10:
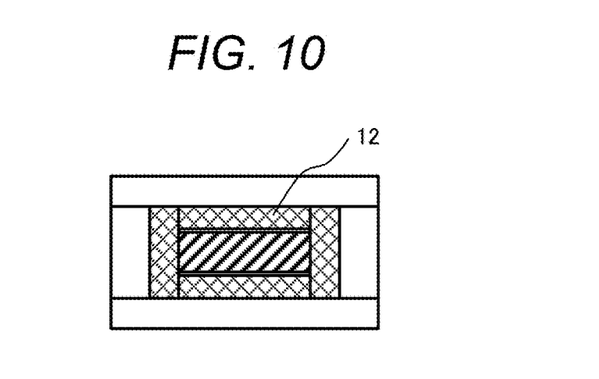
FIG. 10 is a cross-sectional view taken along the C-C line in FIG. 9.

FIG. 9 is a cross-sectional view in the longitudinal direction illustrating an aspect where a second spacer 12 is disposed in a region where the first insulating layer formation step or the second insulating layer formation step have not been performed, and FIG. 10 is a cross-sectional view taken along the C-C line in FIG. 9. As illustrated in FIGS. 9 and 10, in an untreated region where the insulating layer has not been disposed, a spacer corresponding to a thickness of the insulating layer after the molding is disposed, and this ensures the working efficiency and dimensional accuracy when molding the first insulating layer 5 and the second insulating layer 6, and the reliability of the insulation performance.

With the configuration of the above-described embodiment, since the bar or coil is allowed to be partly repaired, a tank where the resin is impregnated is not required. This ensures performing the prompt repair operation on site where the rotating electrical machine is installed without preparing large equipment.

Even for the insulating layer by the resin-rich-insulation method having a wide repair range, the dimensional accuracy and the reliability of the insulation performance are ensured.

The insulation method of the insulating layer before the repair is not limited to the resin-rich-insulation method, and the present invention is also applicable to an insulating layer by any method of single vacuum pressure impregnation and the resin apply insulation.

The present invention is not limited to the above-described examples, and includes various modifications. For example, the above-described examples are described in detail for simply describing the present invention, and are not intended to limit to necessarily include all the described configurations. A part of configurations of one example can be replaced with a configuration of another example. A configuration of another example can be added to the configuration of one example. Regarding a part of the configurations in the respective examples, another configuration can be added, deleted, or replaced.

LIST OF REFERENCE SIGNS 1 insulating layer
2 conductor
3 insulating layer as removal target
4 insulating layer where part of insulating layer before repair is removed
5 first insulating layer
6 second insulating layer
7 cored coil
8 iron plate
9 clamp
10 heat insulating material
11, 12 spacer
20 rotating electrical machine
21 rotor
22 stator
23 stator iron core
24 stator bar or coil
25 repair target region in bar or coil
30 insulating layer after repair

What is claimed is:

1. A repair method for bar or coil of a rotating electrical machine, the bar or coil including a conductor arranged in the rotating electrical machine and an insulating aver having a predetermined insulation thickness disposed on a surface of the conductor, the repair method comprising:
- a step of extracting the bar or coil as a repair target;
- an insulating layer removing step of removing the insulating layer in a part of the bar or coil as the repair target;
- a first insulating layer formation step of disposing a first insulating layer in the part where the insulating layer is removed at the insulating layer removing step, the first insulating layer having an insulation thickness thinner than the predetermined insulation thickness; and
- a second insulating layer formation step of disposing a second insulating layer on a surface of the first insulating layer to form an insulating layer after a repair including the first insulating layer and the second insulating layer, the insulating layer after the repair having a thickness of the predetermined insulation thickness, wherein the insulating layer after the repair has an end portion having a tapered shape when a cross-sectional surface in the longitudinal direction of the bar or coil is viewed, wherein the tapered shape bar or coil having an inclined part, inclined with respect to the surface of the conductor, wherein the inclined part having a length in the longitudinal direction of the bar or coil as L, and the insulating layer after the repair has an insulation thickness as T, $L \geq T \times 3$ is satisfied.

2. The repair method for bar or coil of a rotating electrical machine according to claim 1,
wherein the part where the insulating layer is removed at the insulating layer removing step is divided into at least two regions, a first region and a second region in a longitudinal direction of the bar or coil, and after the first insulating layer formation step and the second insulating layer formation step are performed on one of the at least two regions, the first insulating layer formation step and the second insulating layer formation step are performed on other region of the at least two regions.

3. The repair method for bar or coil of a rotating electrical machine according to claim 2, wherein a length of the at least two regions in the longitudinal direction of the bar or coil is 2000 mm or less.

4. The repair method for bar or coil of a rotating electrical machine according to claim 2, wherein in the at least two regions, a spacer is disposed in a region adjacent to a region on which
the first insulating layer formation step and the second insulating layer formation step are attempted to be performed, the adjacent region being a region on which the first insulating layer is formed or the second insulating layer is formed.

5. The repair method for bar or coil of a rotating electrical machine according to claim 1, wherein the first insulating layer has a thickness of ⅓ or more and ⅔ or less of the predetermined insulation thickness.

6. The repair method for bar or coil of a rotating electrical machine according to claim 2, wherein the insulating layer after the repair has the end portion disposed in each of the at least two regions, and the end portion has a tapered shape when a cross-sectional surface in the longitudinal direction of the bar or coil is viewed.

7. The repair method for bar or coil of a rotating electrical machine according to claim 1, wherein, the first insulating layer formation step and the second insulating layer formation step include taping insulation tape along a circumferential direction of the conductor and pressurizing a surface of the insulation tape with a pressing member to perform molding.

8. The repair method for bar or coil of a rotating electrical machine according to claim 7, wherein the part as the
repair target is covered with a heat insulating material during the molding and is heated by supplying hot air between the bar or coil and the heat insulating material.

* * * * *